US010664592B2

(12) United States Patent
De Gaetano et al.

(10) Patent No.: US 10,664,592 B2
(45) Date of Patent: May 26, 2020

(54) METHOD AND SYSTEM TO SECURELY RUN APPLICATIONS USING CONTAINERS

(71) Applicant: INTERNATIONAL BUSINESS MACHINES CORPORATION, Armonk, NY (US)

(72) Inventors: Rossella De Gaetano, Rome (IT); Alessandro Ghezzi, Rome (IT); Corrado Gianfelici, Rome (IT); Alfonso D'Aniello, Gragnano (IT); Martha Pinelo, Rome (IT); Valerio Mercuri, Rome (IT)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 15/928,259

(22) Filed: Mar. 22, 2018

(65) Prior Publication Data
US 2019/0294778 A1    Sep. 26, 2019

(51) Int. Cl.
*G06F 21/55* (2013.01)
*G06F 16/27* (2019.01)
(Continued)

(52) U.S. Cl.
CPC .......... *G06F 21/53* (2013.01); *G06F 21/552* (2013.01); *G06F 21/567* (2013.01); *G06F 2221/033* (2013.01)

(58) Field of Classification Search
CPC ....... G06F 21/53; G06F 21/567; G06F 21/552
See application file for complete search history.

(56) References Cited

U.S. PATENT DOCUMENTS 10,397,255 B1\* 8/2019 Bhalotra ............. H04L 63/1433
2013/0126248 A1\* 5/2013 Yamaguchi .......... G01G 19/415
177/3
(Continued)

FOREIGN PATENT DOCUMENTS

CN    101425016 A    5/2009

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Haresh N Patel
(74) *Attorney, Agent, or Firm* — Anthony M. Pallone

(57) ABSTRACT

An embodiment of the invention may include a method, computer program product and system for executing a software application. The embodiment may include receiving a notification of an intended execution of the software application directly within an operating system of the computing device. The embodiment may include halting the intended execution. The embodiment may include determining whether the software application is known and safe. The embodiment may include determining whether the software application is known and malicious. The embodiment may include creating a container on the computing device. The embodiment may include executing the software application within the container. The embodiment may include monitoring an execution behavior of the software application. The embodiment may include determining whether an anomaly has occurred within the execution behavior. In response to determining that an anomaly has not occurred, the embodiment may include executing the software application directly within the operating system.

20 Claims, 5 Drawing Sheets

(51) Int. Cl.
*G06F 21/53* (2013.01)
*G06F 21/56* (2013.01)

(56) References Cited

U.S. PATENT DOCUMENTS

| | | | |
|---|---|---|---|
| 2015/0281267 A1* | 10/2015 | Danahy | H04L 63/1416 |
| | | | 726/23 |
| 2017/0036825 A1* | 2/2017 | Kitano | B65D 41/42 |
| 2017/0039369 A1 | 2/2017 | Langton et al. | |
| 2017/0054759 A1 | 2/2017 | Lee et al. | |
| 2017/0098072 A1* | 4/2017 | Stopel | G06F 21/554 |
| 2017/0147819 A1 | 5/2017 | Vasilenko et al. | |
| 2017/0212830 A1* | 7/2017 | Thomas | G06F 8/63 |
| 2017/0353496 A1* | 12/2017 | Pai | G06F 21/53 |
| 2018/0137308 A1* | 5/2018 | Jung | G06F 21/74 |
| 2018/0139238 A1* | 5/2018 | Schultz | G06F 21/6254 |
| 2018/0167487 A1* | 6/2018 | Vyas | G06F 9/5027 |
| 2018/0189484 A1* | 7/2018 | Danahy | G06F 21/566 |
| 2018/0191779 A1* | 7/2018 | Shieh | G06F 16/188 |
| 2018/0198824 A1* | 7/2018 | Pulapaka | H04L 41/5009 |
| 2018/0204001 A1* | 7/2018 | Jung | G06F 21/566 |
| 2018/0253551 A1* | 9/2018 | Chalmandrier-Perna | |
| | | | G06F 21/554 |
| 2018/0336351 A1* | 11/2018 | Jeffries | G06F 21/566 |
| 2019/0158497 A1* | 5/2019 | Diaz Cuellar | H04L 63/083 |
| 2019/0286820 A1* | 9/2019 | Yoon | G06F 21/566 |
| 2019/0294778 A1* | 9/2019 | De Gaetano | G06F 21/53 |

\* cited by examiner

METHOD AND SYSTEM TO SECURELY RUN APPLICATIONS USING CONTAINERS

BACKGROUND

The present invention relates, generally, to the field of computer security, and more specifically, to utilizing operating-system-level virtualization to implement a separate and secure computing environment (e.g. a sandbox).

In computer security, a sandbox is a security mechanism for separating running software applications usually in an effort to mitigate system failures or software vulnerabilities from spreading. A sandbox may be used to run untested or untrusted software applications, possibly from unverified third parties (e.g. suppliers, users, or websites), without risking harm to the host computing device or operating system. For example, sandboxing may be used to test unverified programs which may contain a computer virus or other malicious code without exposing the host computing device to infection. A sandbox typically provides a controlled set of resources for an unverified application to utilize. Network access, the ability to inspect the host computing device, or read from input devices are usually disallowed or restricted.

Operating-system-level virtualization, also known as containerization, refers to an operating system feature in which the kernel allows the creation of multiple isolated user-space environments, called containers. A container is a lightweight, stand-alone, executable package of a piece of software that includes everything needed to run it (i.e., code, runtime, system tools, system libraries, settings, etc.). A computer program running on a typical computer can see all resources (e.g., connected devices, files and folders, network shares, CPU power, and other quantifiable hardware capabilities) of that computer. However, a computer program running inside a container can only see the container's contents and devices assigned to the container.

BRIEF SUMMARY

An embodiment of the invention may include a method, computer program product and system for executing a software application. The embodiment may include receiving a notification of an intended execution, by a user of a computing device, of the software application directly within an operating system of the computing device. Execution of the software application includes modification operations for modifying at least one resource of the computing device. The notification includes a hash value identifying the software application. The embodiment may include halting the intended execution of the software application directly within the operating system of the computing device. The embodiment may include determining whether the software application is known and safe. In response to determining that the software application is not known and safe, the embodiment may include determining whether the software application is known and malicious. In response to determining that the software application is not known and malicious, the embodiment may include creating a container on the computing device. The embodiment may include executing the software application within the container. The embodiment may include monitoring an execution behavior of the software application executed within the container for a predetermined monitoring period. The embodiment may include monitoring activities of the user within the executed software application for the predetermined monitoring period. The embodiment may include determining whether an anomaly has occurred within the execution behavior of the software application during the predetermined monitoring period. In response to determining that an anomaly has not occurred within the execution behavior of the software application during the predetermined monitoring period, the embodiment may include executing the software application directly within the operating system of the computing device.

DETAILED DESCRIPTION

Figure 1:
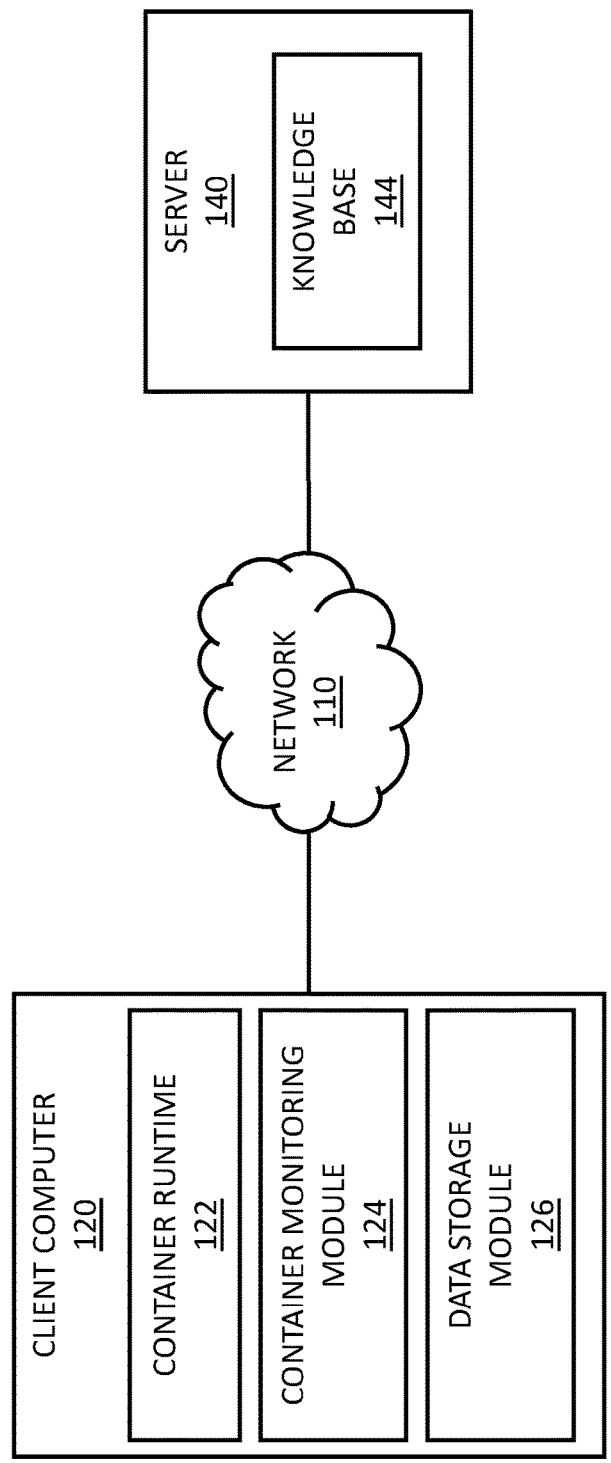
FIG. 1 is a block diagram illustrating a software application monitoring system, in accordance with an embodiment of the present invention.

The proliferation computer systems and the internet, wireless networks, smart devices, and the Internet of Things (IoT) has been accompanied with the proliferation of computer viruses and other kinds of malware. As a result, it can be increasingly difficult to safeguard against exposure to such malicious software. In a typical scenario, exposure can easily result from actions such as, clicking on an executable sent as an attachment in an email, or by clicking on a link in an unverified and/or malicious website. Although some protection may be afforded by antivirus software, such protection may be less effective in situations where a user has opened the door (e.g. clicked on an executable or link) to the malicious software. Furthermore, antivirus software protection may also be less effective in situations where the malicious software is unknown to the antivirus software, as antivirus software responds to known threats.

As mentioned above, a container is a logical environment, created on a host computer, in which a software application can run. The container, and any software application within the container, are abstracted from the underlying host computer's hardware resources (e.g., processors, memory, storage, etc.) and are logically isolated from other containers. Containers are supported by the underlying operating system of the host computer and share the same operating system kernel. The container host provides each container with a virtualized space that grants access only to the resources the container should see. In doing so, the container behaves as if it is the only application running on the system. The container host also controls how much of its resources are available for use by individual containers. A container is deployed via a container image which is a file that represents a combination of application, data, operating system libraries, and all other dependencies needed to execute the application. Once deployed to a host computer with a compatible container platform (e.g., Docker®), the containerized application will run without the need to install or update any other components on the host computer. Moreover, the container is not entitled to physically write on the host computer's disk. This limitation essentially prevents operating system files, of the host computer, from being edited. Thus, the container provides a standard way to package and execute a software application, with all its dependencies, in a computing environment that is separate from the host computing device.

Embodiments of the present invention may include a software application monitoring ("SAM") system 100, described below, which provides a method for running a software application in a monitored container (i.e. a sandbox) before allowing it to run officially in the operation system of the host computing device. A user will experience the same functionalities, look, and feel of the host computing device, and therefore will be unaware that the software application is running within a container. A software application originating from an unsafe/unverified source (e.g. an attachment in an email) may not be executed (e.g. run, installed) directly within the operating system of the host computing device. Rather, SAM system 100 may intercept the request to execute the software application and replace it with a call that may spawn a container within the host computing device and execute the software application within the container. SAM system 100 may then monitor all operating system calls within the container, including operating systems calls requiring write operation(s) on the host computing device's disk. The operating system of the host computing device remains secure as the container is not entitled to physically write to the disk. SAM system 100 may also keep track of all activities the user performs within the containerized software application. SAM system 100 may monitor the operation of the containerized software application for a predetermined monitoring period (PMP). If at the end of the PMP SAM system 100 has not identified sufficient malicious/suspicious operational behavior from execution of the containerized software application, SAM system 100 may classify the software application as safe and execute (e.g. install, run) it within the operating system of the host computing device. Additionally, SAM system 100 may recreate, within the execution of the software application on the disk of the host computing device, all activities performed by the user within the containerized software application. However, if at the end of, or during, the PMP, SAM system 100 has identified sufficient (i.e. exceeds a predetermined threshold) malicious/suspicious operational behavior from execution of the containerized software application, SAM system 100 may classify the software application as a virus, destroy the container and/or notify the user. In either event (i.e. classification as a virus or classification as safe), SAM system 100 may save a hash of the software application, along with its classification, in a knowledge base for potential future use.

Embodiments of the present invention will now be described in detail with reference to the accompanying Figures.

FIG. 1 is a functional block diagram illustrating software application monitoring system 100, in accordance with an embodiment of the present invention. In an example embodiment, SAM system 100 may include client computer 120 and server 140, interconnected via network 110.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between client computer 120 and server 140.

In an example embodiment, client computer 120 may include container runtime 122, container monitoring module 124, and data storage module 126. Client computer 120 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data from and to other computing devices such as server 140, via network 110, and capable of supporting a container runtime (e.g., Docker®) and the functionality required of embodiments of the invention. While client computer 120 is shown as a single device, in other embodiments, client computer 120 may be comprised of a cluster or plurality of computing devices, working together or working separately. Client computer 120 may be described generally with respect to FIG. 3 below.

In an example embodiment, container runtime (CR) 122 may be a program, or subroutine contained in a program, that may operate to implement a container on client computer 120 in response to instructions received from container monitoring module 124. Container runtime 122 may result from any commercially available, open source, or proprietary software (e.g., Docker®, Kubernetes®, Cloud Foundry®) that packages and deploys virtualized application containers on a common operating system, in accordance with embodiments of the invention. Furthermore, in response to instructions received from container monitoring module 124, container runtime 122 may also access an attached volume, in accordance with embodiments of the invention. In an example embodiment, container runtime 122 creates a container on client computer 120 in response to an instruction from container monitoring module 124. Moreover, the created container may provide a computing environment within which to execute a software application specified by container monitoring module 124.

In an example embodiment, container monitoring module (CMM) 124 may be a program, or subroutine contained in a program, that may operate to execute a requested software application, originating from an unsafe/unverified source, within a container on a host computing device, rather than executing the software application directly on the host computing device itself. CMM 124 may also operate to monitor operating system calls from the executing containerized software application, monitor user activity within the software application, mount/unmount a storage volume for the created container, and notify the user of any identified malicious behavior resulting from execution of the software application. An operating system call is the programmatic way in which a computer program requests a service from the kernel of the operating system it is executed on. Services may include hardware related services (e.g. accessing a disk drive), creation and execution of new processes, and communication with kernel services such as process scheduling. Additionally, CMM 124 may operate to monitor operating system calls within client computer 120. For example, CMM 124 may operate to intercept an operating system call, initiated by a user of client computer 120, to execute a software application originating from an unsafe/unverified source (e.g. an executable in an email attachment). The call may contain details such as, source of the software application, identity of the software application, and identify of the user.

In an example embodiment, CMM 124 intercepts a request, from a user of client computer 120, to execute (e.g. run, install) a software application originating from an unverified source, such as an email. Details of the intercepted request may include, for example, a hash value of the identified software application intended for execution on client computer 120. CMM 124 may compare the hash value against a knowledge base (e.g. knowledge base 144) containing a listing of hash values for known safe and known malicious software applications. In an example embodiment where the hash value identifying the software application intended for execution is unknown, CMM 124 may replace the call to execute the software application on client computer 120 with a command to CR 122 instructing it to create a container on client computer 120 and execute the software application within the created container. CMM 124 may then begin to monitor, for a predetermined monitoring period (PMP), the execution activity of the software application within the container as well as the user's activity within the software application. During the course of the PMP, CMM 124 may seek to identify malicious behavior (e.g. unusual or excessive attempts to write to operating system files or system registry) resulting from the execution of the software application within the created container. In an example embodiment where CMM 124 has identified malicious behavior resulting from the execution of the software application within the created container, CMM 124 may instruct CR 122 to destroy the created container. Furthermore, CMM 124 may classify the software application as malicious and update knowledge base 144 with the hash value identifying the software application along with its classification as malicious. CMM 124 may also notify the user of client computer 120 of the identified malicious behavior resulting from execution of the software application. In another embodiment, the operations and functions of CMM 124 may be performed from a remote location (e.g. from server 140). The operations and functions of CMM 124 are described in further detail below with regard to FIG. 2.

In an example embodiment, data storage module 126 may be a magnetic disk storage device of an internal hard drive, separate from an internal hard drive of client computer 120 containing the operating system, used to store digital information generated by activities performed by the user within a containerized software application. Data storage module 126 may be utilized in the event the container hosting the software application is terminated or shutdown. For example, if a text editor application is executing within a container on client computer 120, all documents created and/or edited as a result of the user's use of the text editor may be stored within container allocated memory while the container is active. However, in the event the container is terminated (e.g., shutdown or crashed), data storage module 126 may be utilized to store documents created and/or edited as a result of the user's use of the text editor in order to safeguard against a loss of data. Moreover, in an example embodiment, data storage module 126 may be editable only by the container itself and may be mounted/unmounted to the container by CMM 124. In another embodiment, data storage module 126 may be a semiconductor storage device such as ROM, EPROM, flash memory or any other computer-readable tangible storage device that can store digital information.

In an example embodiment, server 140 may include knowledge base 144. Server 140 may be a desktop computer, a notebook, a laptop computer, a blade server, a networked computer appliance, a virtual device, or any other networked electronic device or computing system capable of receiving and sending data from and to other computing devices such as client computer 120, via network 110, and capable of supporting the functionality required of embodiments of the invention. While server 140 is shown as a single device, in other embodiments, server 140 may be comprised of a cluster or plurality of computing devices, working together or working separately. Server 140 may be described generally with respect to FIG. 3 below.

In an example embodiment, knowledge base 144 represents a database management system that may be used to store a listing of hash values representing known safe and known malicious software applications. Knowledge base 144 may be a shared repository providing and storing this information for use by computing devices within SAM system 100. Knowledge base 144 may be utilized by CMM 124 to determine if a hash value, representing a software application intended for execution on client computer 120, is listed among the known safe and known malicious software applications. Furthermore, knowledge base 144 may receive, from CMM 124, a hash value and corresponding classification which identifies a software application evaluated by CMM 124. The received classification may label the software application, represented by the received corresponding hash value, as either safe or malicious. In an example embodiment, knowledge base 144 receives, from CMM 124, a hash value and corresponding classification for a software application intended for execution on client computer 120 and evaluated by CMM 124.

Figure 2:
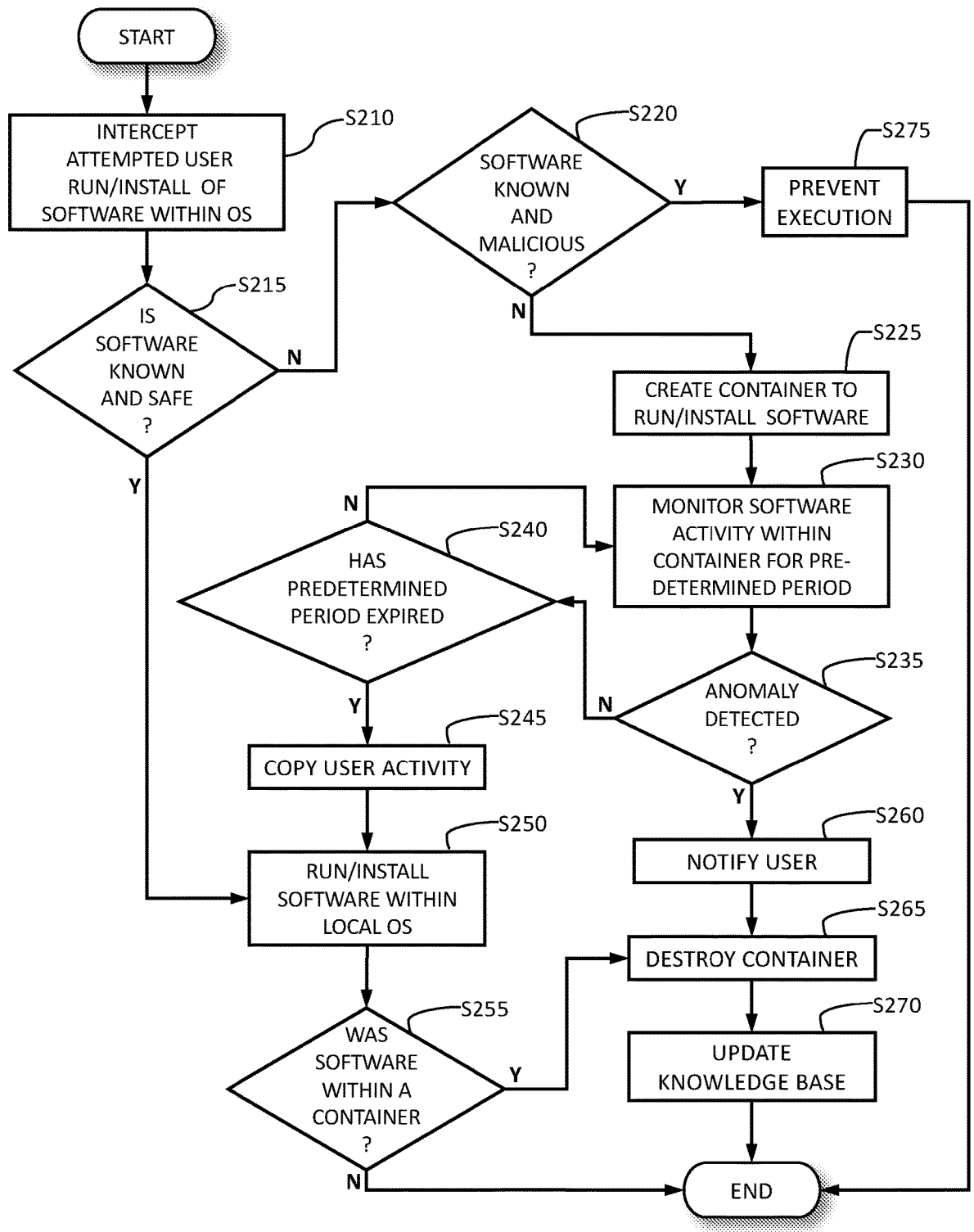
FIG. 2 is a flowchart illustrating the operations of the container monitoring module of FIG. 1, in accordance with an embodiment of the invention.

FIG. 2 shows a flowchart illustrating the operations of container monitoring module 124 in accordance with an example embodiment of the invention. Referring to step S210, CMM 124 may intercept an attempted software application execution. The intercepted attempt may result from a user of client computer 120 attempting to execute (e.g. run, install) a software application originating from an unverified or unsafe source (e.g. an executable in an email attachment). In an example embodiment, CMM 124 may monitor operating system calls to execute a software application directly within the operating system of client computer 120 from an unverified or untrusted source, such as an email or a website. CMM 124 may intercept such a call. The intercepted call may include information such as a hash value identifying the software application (i.e. the executable) intended for execution, identification of the source of the software application (e.g. email, website), and identification of the calling user (e.g. user id). In an example embodiment, CMM 124 intercepts an operating system call, initiated by a user of client computer 120, attempting to execute a software application originating from an email. Furthermore, in an example embodiment, the intercepted all includes a hash value identifying the software application intended for execution.

Referring to step S215, CMM 124 may determine if the identified software application intended for execution is a known safe software application. As part of making this determination, CMM 124 may access a listing of hash values, stored in knowledge base 144, identifying known safe software applications. CMM 124 may then compare a received hash value against the listing of hash values to determine if a match exists. If CMM 124 determines that a match exists, and therefore the identified software application intended for execution is known and safe, CMM 124 may proceed to step S250. However, if CMM 124 determines that a match does not exist, CMM 124 may proceed to step S220. In an example embodiment, CMM 124 may access knowledge base 144 to determine if the hash value, received in step S210, matches any hash values for known safe software applications. Further, in an example embodiment, CMM 124 may determine that the hash value received in step S210 does not match any of the hash values representing known safe software applications and therefore the software application intended for execution on client computer 120 is not known and safe.

Referring to step S220, CMM 124 may determine if the identified software application intended for execution is a known malicious software application. As part of making this determination, CMM 124 may access a listing of hash values, stored in knowledge base 144, identifying known malicious software applications. CMM 124 may then compare a received hash value against the listing of hash values to determine if a match exists. If CMM 124 determines that a match exists, and therefore the identified software application intended for execution is known and malicious, CMM 124 may proceed to step S275 in which CMM 124 prevents/denies execution of the software application associated with the hash value received in step S210. Additionally, in step S275, CMM 124 may alert the user of client computer 120 of the attempted execution of a known malicious software application and of the subsequent denial of execution. However, if CMM 124 determines that a match does not exist, CMM 124 may proceed to step S225. In an example embodiment, CMM 124 may access knowledge base 144 to determine if the hash value, received in step S210, matches any hash values for known malicious software applications. Further, in an example embodiment, CMM 124 may determine that the hash value received in step S210 does not match any of the hash values representing known malicious software applications and therefore the software application intended for execution on client computer 120 is not known and malicious.

Referring to step S225, in response to determining that the software application identified by the hash value received in step S210 is neither a known safe software application or a known malicious software application (i.e. the software application is unknown), CMM 124 may replace the call attempting to execute the software application directly on client computer 120 with a directive to CR 122. In an example embodiment, CMM 124 may create a container, via CR 122, on client computer 120 and to execute the software application within the created container. The file structure within the created container may mirror the file structure of client computer 120.

Referring to step S230, CMM 124 may begin monitoring, for a predetermined monitoring period, the execution behavior of the software application within the container created in step S225. In an example embodiment, monitoring the execution behavior of the software application within the created container may include tracking/logging all operating system calls made by the software application. For example, operating system calls requiring a write operation on the hard disk. Monitoring operating system calls may be performed by relying on audit functionalities provided by CR 122 as events which occur within the container may be recorded in an audit log. In an example embodiment, CMM 124 may extract the audit log, via container APIs, for evaluation. Moreover, attempts to write in the container may also be traced via utilities such as lsof, which is a command meaning "list open files" and is used in many Unix-like systems to report a list of all open files and the processes that opened them. The lsof utility may also provide information about attempts to write/read protected files. In an example embodiment, the information provided by the lsof utility may also be extracted by CMM 124 for evaluation. Continuing with step S230, CMM 124 may also begin monitoring, for the above mentioned predetermined monitoring period, all activities performed by the user within the software application.

Referring to step S235, CMM 124 may operate as an analytics engine to determine if an anomaly (i.e. malicious behavior) has been detected from the software application during its execution within the container created in step S225. An anomaly may be exhibited by unusual operating system call patterns such as, unexpected or excessive calls attempting to write to operating system files, attempted widespread access to all files on disk, and/or constantly growing consumption of RAM. CMM 124 may examine operating system call patterns contained in audit logs and lsof utility information to identify potential operating system call patterns indicative of an anomaly. In an embodiment, CMM 124 may be trained using data from "safe" audit logs (i.e. audit logs of verified/trusted software execution) to determine and extract known patterns of safe software execution (i.e. expected operating system call patterns). In an example embodiment, known patterns of safe/trusted software execution may be stored within knowledge base 144 and accessed by CMM 124. Anything that exceeds the average occurrences of operating system calls or deviates from the known pattern of safe operating system calls may be considered an anomaly. For example, a software application accessing a registry entry every half second may be flagged as an anomaly when an extracted pattern of safe software execution demonstrates accessing the registry entry only once an hour. In an example embodiment, CMM 124 may screen the audit logs and lsof utility information, extracted in step S230, for known patterns of safe and malicious software execution, in order to identify any potential malicious behavior resulting from execution of the software application within the created container. If an anomaly has been detected, CMM 124 may proceed to step S260. However, if an anomaly has not been detected, CMM 124 may proceed to step S240. In an example embodiment, CMM 124 has not detected an anomaly resulting from execution of the software application within the created container.

Referring to step S240, CMM 124 may determine if the predetermined monitoring period (PMP) has elapsed. In an example embodiment, the PMP may be determined by an administrator of SAM system 100. For example, given the speed with which a malicious software application may infiltrate a host computing device, a SAM system 100 administrator may define a typical PMP as eight hours or less. If CMM 124 determines that the PMP has expired, CMM 124 may proceed to step S245. However, if CMM 124 determines that the PMP has not expired, CMM 124 may proceed back to step S230. In an example embodiment, CMM 124 may determine that the PMP for execution of the software application launched within the container created in step S225 has elapsed.

In another embodiment, it may be the case where CMM 124 has determined that the PMP for execution of the software application launched within the created container has not expired and therefore insufficient time has elapsed to identify potential malicious behavior. However, it may further be the case that execution of the software application is being terminated (e.g. the user attempts a shutdown of the software application, the container itself attempts shutdown). In such an embodiment, CMM 124 may perform several actions before proceeding to step S230. In particular, in response to determining that the PMP has not expired and determining that cessation of execution of the software application is imminent, CMM 124 may place the software application shutdown on hold and attach a volume (e.g. data storage module 126) to the container. CMM 124 may further copy all data generated from the user's actions within the software application into the attached volume. The file structure of the attached volume will mirror the file structure of the container so as to enable a seamless application from the perspective of the user. Furthermore, the copied data may be stored within the attached volume in a quarantined mode. Once all of the user generated data has been copied into the attached volume, CMM 124 may detach the volume. CMM 124 may then determine if execution of the software application is to be resumed by monitoring attempts from a user to launch the software application. In the event CMM 124 determines that execution of the software application is to be resumed, CMM 124 may create, via CR 122, a new container and execute the software application within the newly created container. Moreover, CMM 124 may attach the volume (e.g. data storage module 126) containing the copied user generated data to the newly created container and copy the user generated data into the memory of the newly created container. At this point CMM 124 may then proceed to step S230. However, if CMM 124 determines that execution of the software application is not to be resumed (e.g. CMM 124 has not intercepted any attempts from the user to re-launch the software application), CMM 124 may then determine whether a predefined quarantine period has elapsed. The data generated from the user's actions within the software application and copied into the attached volume may only be stored as long as the predefined quarantine period has not elapsed. If CMM 124 determines that the predefined quarantine period has elapsed, CMM 124 may destroy the quarantined copied data stored within the volume. If CMM 124 determines that the predefined quarantine period has not elapsed, CMM 124 may return to the determination of whether execution of the software application is to be resumed.

Referring to step S245, in response to determining that the PMP for execution of the software application launched within the container created in step S225 has elapsed, and in response to determining that an anomaly has not been detected, CMM 124 may classify the software application as safe. Furthermore, in an example embodiment, CMM 124 may execute the copy of all data generated from the user's actions within the software application into data storage module 126. In facilitating the data copy, CMM 124 may identify which files are to be copied through use of the lsof utility and through review of container audit logs. CMM 124 may attach data storage module 126 to the running container in write mode. Subsequently, the identified files (e.g. files edited with the software application, files created with the software application) are copied. The file structure within data storage module 126 may mirror the file structure within the running container. Registry entries may not be copied since they are typically handled by an installation procedure, rather, CMM 124 may be interested only in valuable artifacts produced by the software application. For example, if the software application is a text editor, CMM 124 may only copy documents generated/edited by the text editor. The running container by definition has a set of pre-defined read-only directories, therefore, in an example embodiment, CMM 124 may focus the data harvesting on the potentially writable directories of the running container, such as the /var directory and the /home directory. In an example embodiment, CMM 124 may copy all of the user generated data into data storage module 126. Thereafter, CMM 124 may detach data storage module 126 from the running container.

Referring to step S250, CMM 124 may execute (e.g. install, run) the software application, identified in the software application execution attempt intercepted in step S210, directly on the hard disk of client computer 120. In an example embodiment, the command to execute the software application directly on the hard disk of client computer 120 may be given subsequent to the completed copy of all user generated data into data storage module 126 (step S245). As part of the execution command, CMM 124 may also attach (i.e. mount) data storage module 126 to the hard disk of client computer 120 and copy of all of the user generated data from data storage module 126 into the hard disk of client computer 120. As the file structure of data storage module 126 will mirror the file structure of client computer 120, the user of client computer 120 may perceive the data as having always been stored within the hard disk of client computer 120 and may be unaware that the software application was previously executed within a container. In continuance with the execution command, once all of the user generated data from data storage module 126 has been copied into the hard disk of client computer 120, CMM 124 may destroy the user generated data stored within data storage module 126 and detach (i.e. unmount) data storage module 126 from the hard disk of client computer 120. In another embodiment, the instruction to execute the software application directly on the hard disk of client computer 120 may be given in response to CMM 124 determining that the identified software application is known and safe, as described in step S215 above.

Referring to step S255, CMM 124 may determine whether the software application executed directly on the hard disk of client computer 120 in step S250 was previously executed within a container on client computer 120. CMM 124 may determine that the software application was not previously executed within a container if the instruction to execute the software application directly on the hard disk of client computer 120 was given in response to CMM 124 determining that the identified software application is known and safe. If CMM 124 determines that the software application was previously executed within a container on client computer 120, CMM 124 may proceed to step S265. However, if CMM 124 determines that the software application was not previously executed within a container on client computer 120, the operations of CMM 124 may terminate. In an example embodiment, CMM 124 may determine that the software application was previously executed within a container and proceed to step S265.

Referring to step S260, CMM 124 may notify the user of client computer 120 that execution of the software application, identified by the hash value received in step S210, has resulted in potentially malicious behavior and that the software application has been marked as a virus. The notification may further inform the user that client computer 120 has not been affected by the potentially malicious behavior as execution of the software application occurred within a to be destroyed container.

Referring to step S265, in response to determining that the software application was previously executed within a container, CMM 124 may destroy, via CR 122, the container in which the software application was executing. In an example embodiment, CMM 124 may destroy, via CR 122, the container created in step S225 on client computer 120.

Referring to step S270, CMM 124 may update knowledge base 144 with the hash value, received in step S210, along with a classification labeling the software application as safe or as malicious. In a system where, multiple users may attempt to execute the same software application, if it can be initially determined, via CMM 124 referencing knowledge base 144, that the software application is already known and safe, CMM 124 may automatically install the software application on the client computing device (e.g. client computer 120) any bypass the container execution route. On the other hand, if it can be initially determined, via CMM 124 referencing knowledge base 144, that the software application is already known and malicious, CMM 124 may prevent execution of the software application and alert the user. In an example embodiment, in addition to hash values and corresponding classifications (i.e. safe, malicious), knowledge base 144 may also store known patterns of safe and malicious software execution resulting from training of CMM 124. In an embodiment, knowledge base 144 may also serve as a source of information for antivirus software.

Figure 3:
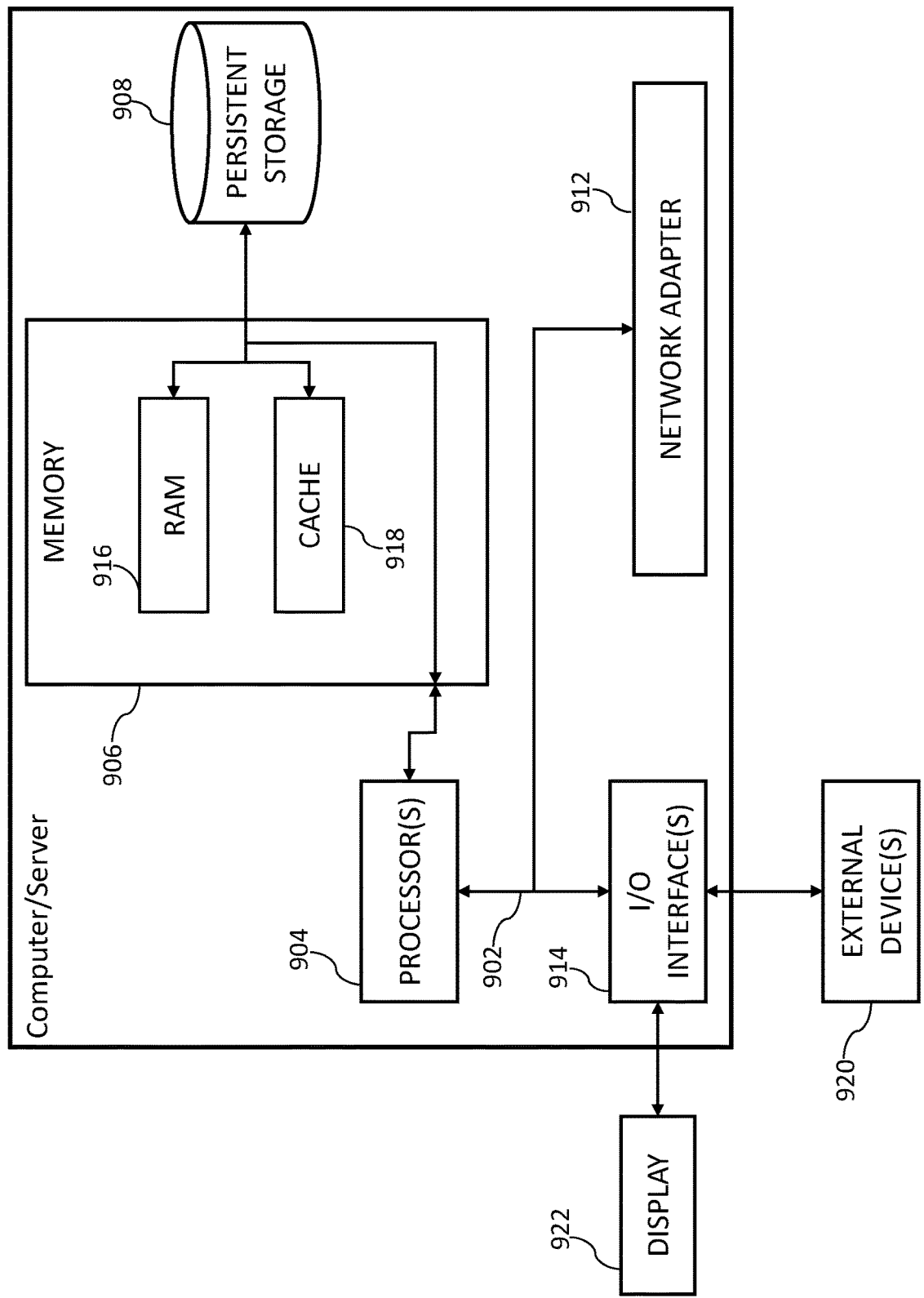
FIG. 3 is a block diagram depicting the hardware components of the software application monitoring system of FIG. 1, in accordance with an embodiment of the invention.

FIG. 3 depicts a block diagram of components of client computer 120 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Client computer 120 and server 140 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs container runtime 122 and container monitoring module 124 in client computer 120 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs container runtime 122 and container monitoring module 124 in client computer 120 may be downloaded to persistent storage 908 through network adapter 912.

I/O interface(s) 914 allows for input and output of data with other devices that may be connected to client computer 120 and server 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs container runtime 122 and container monitoring module 124 in client computer 120 can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
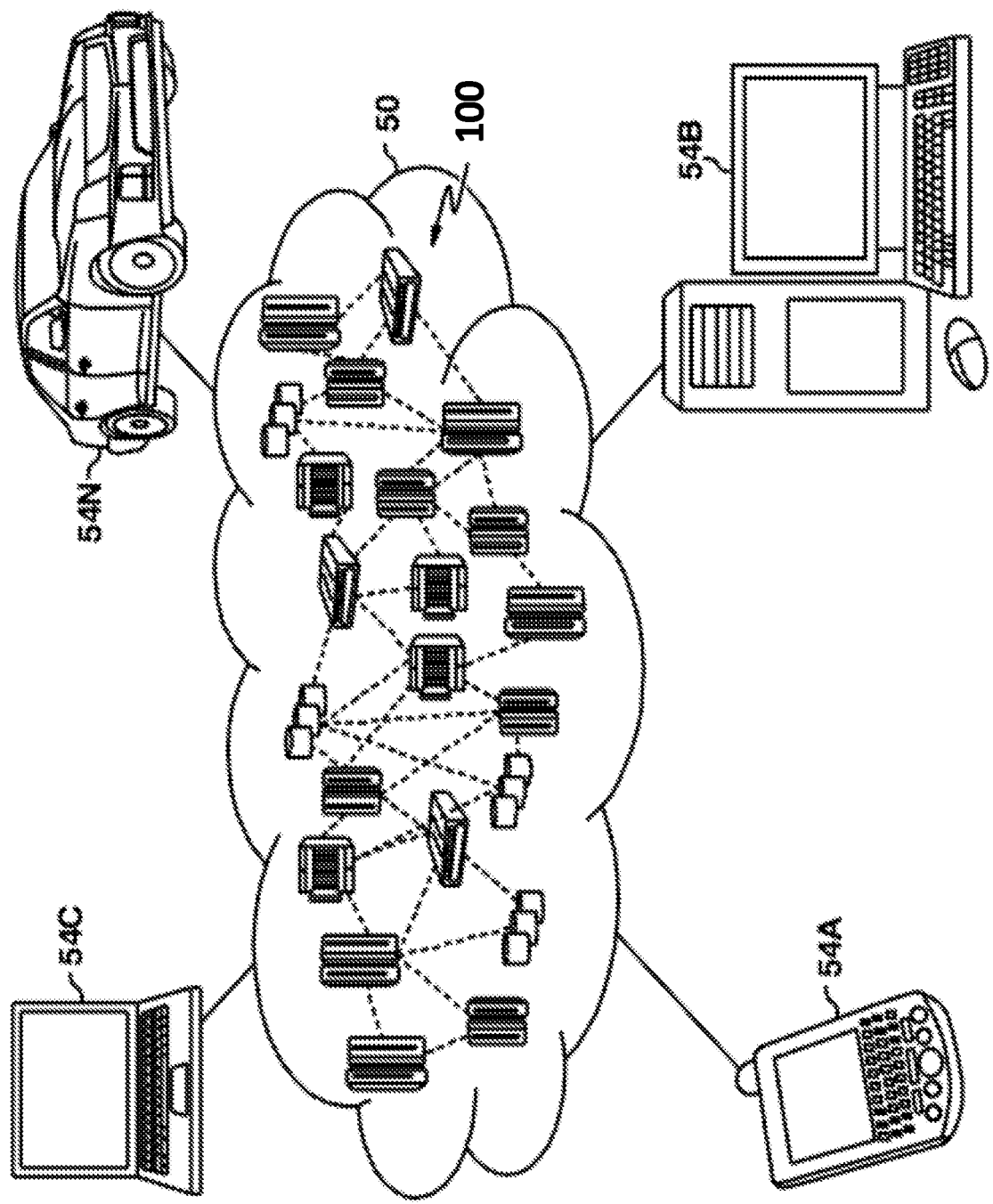
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
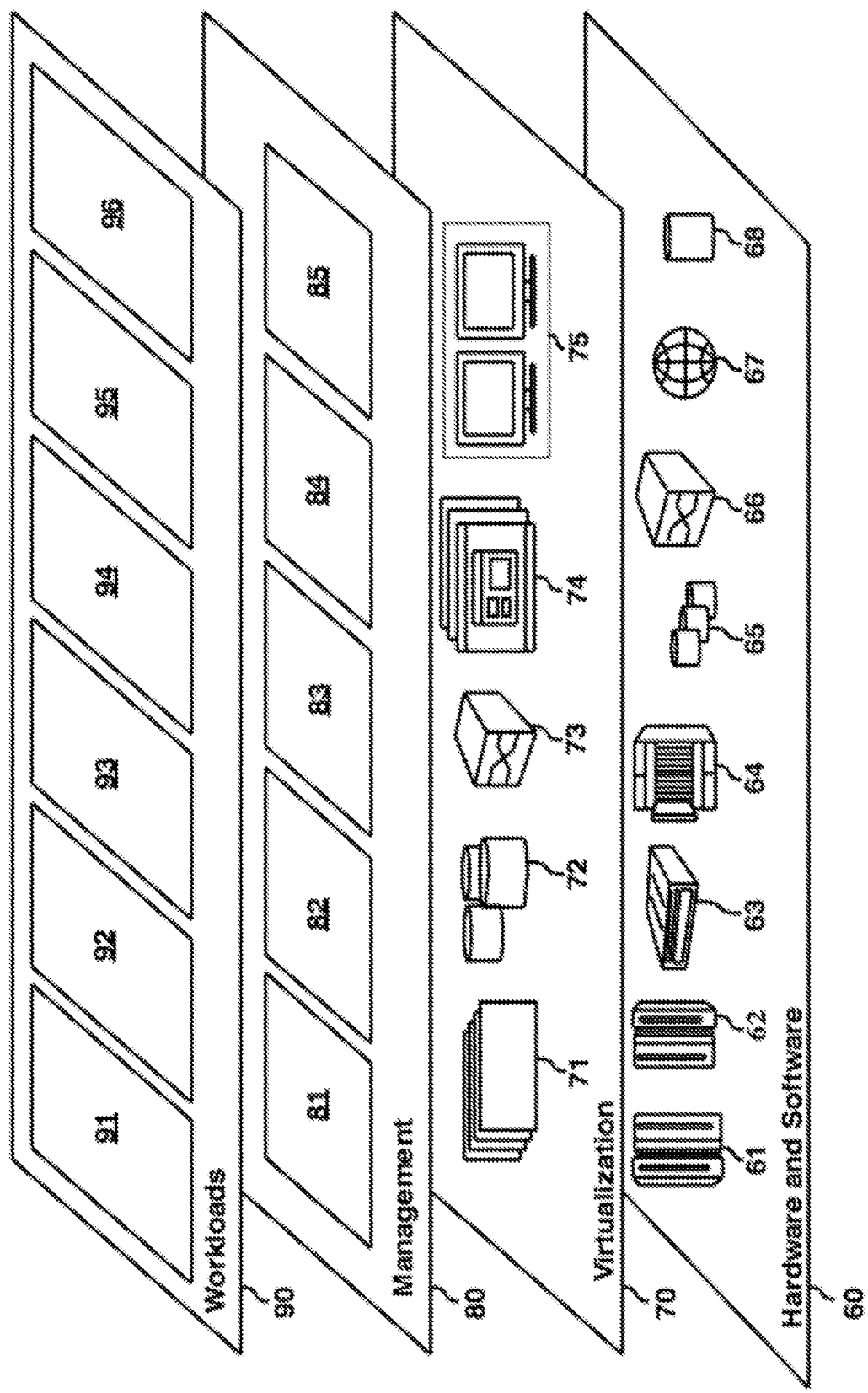
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68;

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75;

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA;

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software application monitoring system 96. Software application monitoring system 96 may relate to securely executing a software application, from an unverified/untrusted source, within a container.

The descriptions of the various embodiments of the present invention have been presented for purposes of illustration, however they are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for executing a software application, the method comprising:
   receiving a notification of an intended execution, by a user of a computing device, of the software application directly within an operating system of the computing device, wherein execution of the software application comprises modification operations for modifying at least one resource of the computing device, and wherein the notification comprises a hash value identifying the software application;
   halting the intended execution of the software application directly within the operating system of the computing device;
   determining whether the software application is known and safe;
   in response to determining that the software application is not known and safe, determining whether the software application is known and malicious;
   in response to determining that the software application is not known and malicious, creating a container on the computing device;
   executing the software application within the container;
   monitoring an execution behavior of the software application executed within the container for a predetermined monitoring period;
   monitoring activities of the user within the executed software application for the predetermined monitoring period;
   determining whether an anomaly has occurred within the execution behavior of the software application during the predetermined monitoring period; and
   in response to determining that an anomaly has not occurred within the execution behavior of the software application during the predetermined monitoring period, executing the software application directly within the operating system of the computing device.

2. The method of claim 1, wherein the software application may be determined as known and safe if the hash value identifying the software application matches an entry on a listing of hash values for known and safe software applications, and wherein the software application may be determined as known and malicious if the hash value identifying the software application matches an entry on a listing of hash values for known and malicious software applications.

3. The method of claim 2, further comprising:
   in response to determining that the software application is known and safe, resuming the intended execution of the software application directly within the operating system of the computing device; and
   in response to determining that the software application is known and malicious, denying the intended execution of the software application directly within the operating system of the computing device and notifying the user.

4. The method of claim 1, wherein executing the software application directly within the operating system of the computing device further comprises:
   copying, form the container, data generated as a result of activities of the user within the executed software application, wherein the data is copied into an attached storage volume;
   saving, to the computing device, the data copied from the container and stored within the attached storage volume;
   destroying the container; and
   updating the listing of hash values for known and safe software applications with the hash value identifying the software application.

5. The method of claim 1, wherein monitoring the execution behavior of the software application executed within the container comprises logging all calls made, by the software application, to the operating system of the computing device, and wherein the logged calls comprise a pattern of execution for the software application.

6. The method of claim 1, wherein an anomaly may be determined as having occurred when the execution behavior of the software application comprises an element from the group consisting of: unexpected or excessive calls attempting to write to files of the operating system, attempted widespread access to all files of the computing device, constantly growing consumption of RAM belonging to the computing device, and deviation from known trusted software execution patterns.

7. The method of claim 1, further comprising:
   in response to determining that an anomaly has occurred within the execution behavior of the software application during the predetermined monitoring period, notifying the user;
   destroying the container; and
   updating the listing of hash values for known and malicious software applications with the hash value identifying the software application.

8. A computer program product for executing a software application, the computer program product comprising:
   one or more computer-readable tangible storage devices and program instructions stored on at least one of the one or more tangible storage devices, the program instructions comprising:
   program instructions to receive a notification of an intended execution, by a user of a computing device, of the software application directly within an operating system of the computing device, wherein execution of the software application comprises modification operations for modifying at least one resource of the computing device, and wherein the notification comprises a hash value identifying the software application;
   program instructions to halt the intended execution of the software application directly within the operating system of the computing device;
   program instructions to determine whether the software application is known and safe;
   in response to determining that the software application is not known and safe, program instructions to determine whether the software application is known and malicious;
   in response to determining that the software application is not known and malicious, program instructions to create a container on the computing device;
   program instructions to execute the software application within the container;

program instructions to monitor an execution behavior of the software application executed within the container for a predetermined monitoring period;

program instructions to monitor activities of the user within the executed software application for the predetermined monitoring period;

program instructions to determine whether an anomaly has occurred within the execution behavior of the software application during the predetermined monitoring period; and in response to determining that an anomaly has not occurred within the execution behavior of the software application during the predetermined monitoring period, program instructions to execute the software application directly within the operating system of the computing device.

9. The computer program product of claim 8, wherein the software application may be determined as known and safe if the hash value identifying the software application matches an entry on a listing of hash values for known and safe software applications, and wherein the software application may be determined as known and malicious if the hash value identifying the software application matches an entry on a listing of hash values for known and malicious software applications.

10. The computer program product of claim 9, further comprising:

in response to determining that the software application is known and safe, program instructions to resume the intended execution of the software application directly within the operating system of the computing device; and in response to determining that the software application is known and malicious, program instructions to deny the intended execution of the software application directly within the operating system of the computing device and notify the user.

11. The computer program product of claim 8, wherein executing the software application directly within the operating system of the computing device further comprises:

program instructions to copy, form the container, data generated as a result of activities of the user within the executed software application, wherein the data is copied into an attached storage volume;

program instructions to save, to the computing device, the data copied from the container and stored within the attached storage volume;

program instructions to destroy the container; and program instructions to update the listing of hash values for known and safe software applications with the hash value identifying the software application.

12. The computer program product of claim 8, wherein program instructions to monitor the execution behavior of the software application executed within the container comprises program instructions to log all calls made, by the software application, to the operating system of the computing device, and wherein the logged calls comprise a pattern of execution for the software application.

13. The computer program product of claim 8, wherein an anomaly may be determined as having occurred when the execution behavior of the software application comprises an element from the group consisting of: unexpected or excessive calls attempting to write to files of the operating system, attempted widespread access to all files of the computing device, constantly growing consumption of RAM belonging to the computing device, and deviation from known trusted software execution patterns.

14. The computer program product of claim 8, further comprising:

in response to determining that an anomaly has occurred within the execution behavior of the software application during the predetermined monitoring period, program instructions to notify the user;

program instructions to destroy the container; and program instructions to update the listing of hash values for known and malicious software applications with the hash value identifying the software application.

15. A computer system for executing a software application, the computer system comprising:

one or more processors, one or more computer-readable memories, one or more computer-readable tangible storage devices, and program instructions stored on at least one of the one or more tangible storage devices for execution by at least one of the one or more processors via at least one of the one or more memories, the program instructions comprising:

program instructions to receive a notification of an intended execution, by a user of a computing device, of the software application directly within an operating system of the computing device, wherein execution of the software application comprises modification operations for modifying at least one resource of the computing device, and wherein the notification comprises a hash value identifying the software application;

program instructions to halt the intended execution of the software application directly within the operating system of the computing device;

program instructions to determine whether the software application is known and safe;

in response to determining that the software application is not known and safe, program instructions to determine whether the software application is known and malicious;

in response to determining that the software application is not known and malicious, program instructions to create a container on the computing device;

program instructions to execute the software application within the container;

program instructions to monitor an execution behavior of the software application executed within the container for a predetermined monitoring period;

program instructions to monitor activities of the user within the executed software application for the predetermined monitoring period;

program instructions to determine whether an anomaly has occurred within the execution behavior of the software application during the predetermined monitoring period; and in response to determining that an anomaly has not occurred within the execution behavior of the software application during the predetermined monitoring period, program instructions to execute the software application directly within the operating system of the computing device.

16. The computer system of claim 15, wherein the software application may be determined as known and safe if the hash value identifying the software application matches an entry on a listing of hash values for known and safe software applications, and wherein the software application may be determined as known and malicious if the hash value identifying the software application matches an entry on a listing of hash values for known and malicious software applications.

17. The computer system of claim 16, further comprising:
in response to determining that the software application is known and safe, program instructions to resume the intended execution of the software application directly within the operating system of the computing device; and in response to determining that the software application is known and malicious, program instructions to deny the intended execution of the software application directly within the operating system of the computing device and notify the user.

18. The computer system of claim 15, wherein executing the software application directly within the operating system of the computing device further comprises:
program instructions to copy, form the container, data generated as a result of activities of the user within the executed software application, wherein the data is copied into an attached storage volume;
program instructions to save, to the computing device, the data copied from the container and stored within the attached storage volume;
program instructions to destroy the container; and
program instructions to update the listing of hash values for known and safe software applications with the hash value identifying the software application.

19. The computer system of claim 15, wherein program instructions to monitor the execution behavior of the software application executed within the container comprises program instructions to log all calls made, by the software application, to the operating system of the computing device, and wherein the logged calls comprise a pattern of execution for the software application.

20. The computer system of claim 15, wherein an anomaly may be determined as having occurred when the execution behavior of the software application comprises an element from the group consisting of: unexpected or excessive calls attempting to write to files of the operating system, attempted widespread access to all files of the computing device, constantly growing consumption of RAM belonging to the computing device, and deviation from known trusted software execution patterns.

* * * * *